United States Patent
Thallner et al.

(10) Patent No.: US 10,279,551 B2
(45) Date of Patent: May 7, 2019

(54) METHOD FOR PRODUCING A MICROLENS

(71) Applicant: EV Group GmbH, St. Florian am Inn (AT)

(72) Inventors: Erich Thallner, St. Florian (AT); Markus Wimplinger, Ried im Innkreis (AT); Michael Kast, Wels (AT)

(73) Assignee: EV Group GmbH, St. Florian am Inn (AT)

( * ) Notice: Subject to any disclaimer, the term of this patent is extended or adjusted under 35 U.S.C. 154(b) by 0 days.

(21) Appl. No.: 15/954,970

(22) Filed: Apr. 17, 2018

(65) Prior Publication Data

US 2018/0229458 A1  Aug. 16, 2018

Related U.S. Application Data

(60) Division of application No. 14/700,217, filed on Apr. 30, 2015, now abandoned, which is a continuation of application No. 13/583,652, filed as application No. PCT/EP2010/002065 on Mar. 31, 2010, now Pat. No. 9,052,422.

(51) Int. Cl.
 B29D 11/00 (2006.01)
 G02B 3/00 (2006.01)

(52) U.S. Cl.
 CPC ...... B29D 11/00375 (2013.01); G02B 3/0031 (2013.01)

(58) Field of Classification Search
 CPC combination set(s) only.
 See application file for complete search history.

(56) References Cited

U.S. PATENT DOCUMENTS

| | | | |
|---|---|---|---|
| 4,154,506 A | 5/1979 | Yevick | |
| 5,324,623 A | 6/1994 | Tsumori | |
| 5,853,960 A | 12/1998 | Tran et al. | |
| 5,871,888 A | 2/1999 | Heremans et al. | |
| 6,049,430 A | 4/2000 | Heanue et al. | |
| 6,747,346 B2 | 6/2004 | Saito | |
| 6,805,902 B1 | 10/2004 | Hayes | |
| 6,814,901 B2 | 11/2004 | Itoh | |
| 6,846,137 B1 | 1/2005 | Border et al. | |
| 6,890,460 B2 | 5/2005 | Huang | |
| 9,052,422 B2 * | 6/2015 | Thallner | G02B 3/0031 |
| 2003/0197293 A1 | 10/2003 | Huang | |
| 2006/0044450 A1 | 3/2006 | Wolterink et al. | |

(Continued)

FOREIGN PATENT DOCUMENTS

| JP | 04-326301 A | 11/1992 |
|---|---|---|
| JP | H04-326031 A | 11/1992 |

(Continued)

OTHER PUBLICATIONS

International Search Report from corresponding International Patent Application No. PCT/EP2010/02065, dated Dec. 13, 2010.

(Continued)

*Primary Examiner* — Mathieu D Vargot
(74) *Attorney, Agent, or Firm* — Kusner & Jaffe

(57) ABSTRACT

A method for producing a microlens with a carrier wafer, in which a lens in one opening of the carrier wafer is molded into the carrier wafer by stamping of the lens and to a corresponding device for executing the method and to a microlens which has been produced using the method.

14 Claims, 6 Drawing Sheets

(56) References Cited

U.S. PATENT DOCUMENTS

2008/0290435 A1    11/2008   Oliver et al.
2009/0231826 A1    9/2009   Lake
2011/0085070 A1    4/2011   Kang et al.

FOREIGN PATENT DOCUMENTS

| JP | 2005-539276 A | 12/2005 |
| JP | 2009-153178 A | 7/2009 |
| JP | 2009-300596 A | 12/2009 |
| JP | 2010-532492 A | 10/2010 |
| WO | WO 2008/133864 A2 | 11/2008 |
| WO | WO 2010/033211 A1 | 3/2010 |

OTHER PUBLICATIONS

Japanese Office Action received in Japanese Patent Application No. 2013-501636, dated Dec. 24, 2013 (including English Translation—4 Pages).

\* cited by examiner

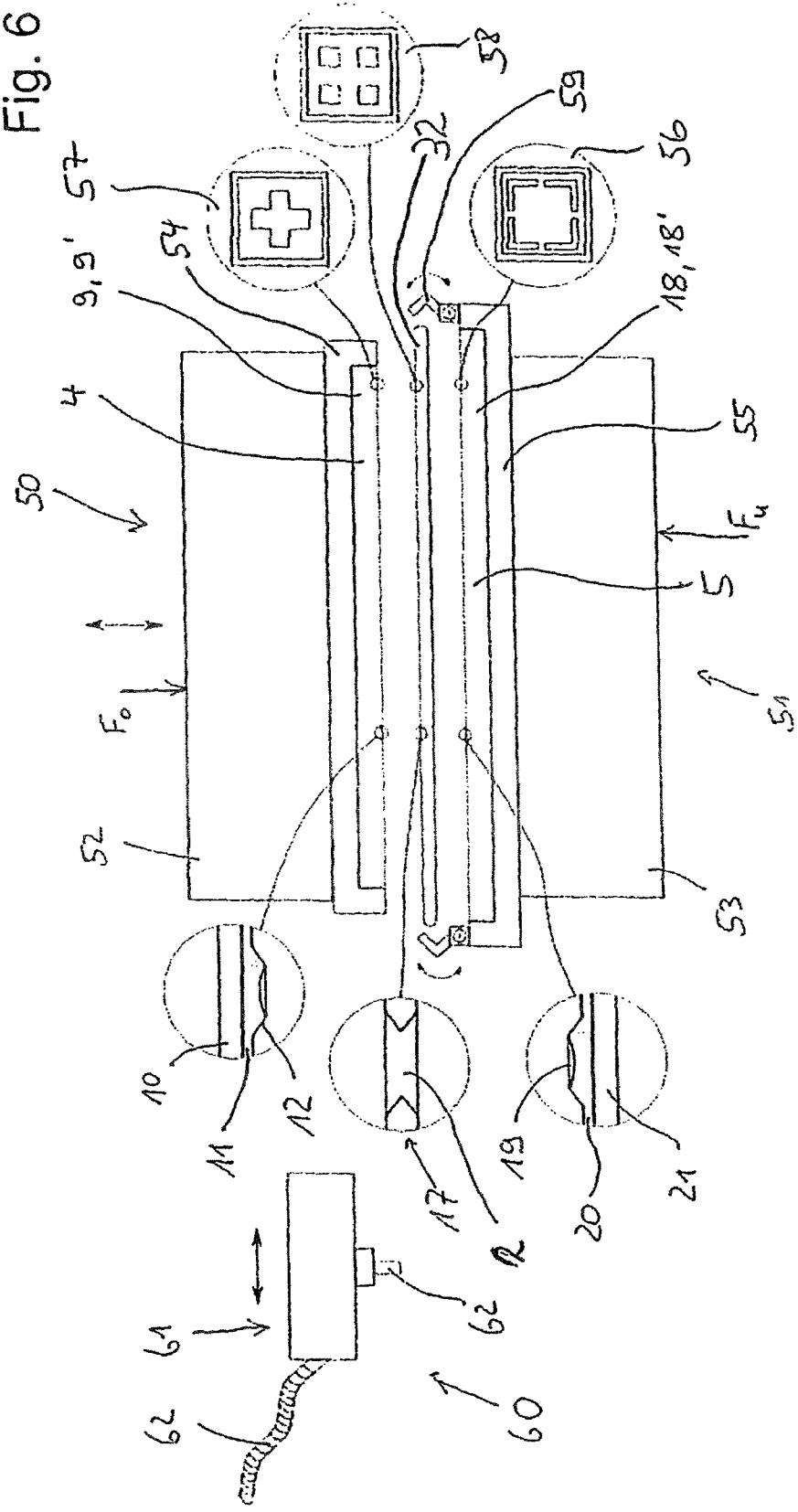

ated Application No. PCT/EP2010/002065, filed Mar. 31, 2010, said patent applications hereby fully incorporated herein by reference.

METHOD FOR PRODUCING A MICROLENS

RELATED APPLICATIONS

The present application is a divisional of U.S. application Ser. No. 14/700,217, filed Apr. 30, 2015, which is a continuation of U.S. application Ser. No. 13/583,652, filed Sep. 28, 2012 (now U.S. Pat. No. 9,052,422, issued Jun. 9, 2015), which is a U.S. National Stage Application of International Application No. PCT/EP2010/002065, filed Mar. 31, 2010, said patent applications hereby fully incorporated herein by reference.

FIELD OF THE INVENTION

This invention relates to a microlens, a method for producing a microlens and a device for producing a microlens.

BACKGROUND OF THE INVENTION

Primarily microlenses are used for devices which require an optical focusing means, such as for example cameras and mobile phones. As a result of miniaturization pressure, the functional components are becoming increasingly smaller; this also applies to microlenses of the generic type. The further the microlenses are to be miniaturized, the more difficult their optically correct production becomes because at the same time there is enormous cost pressure for microlenses to be ideally produced in large-scale production.

In the prior art microlenses are produced on a carrier substrate by various production methods, as shown for example in U.S. Pat. Nos. 6,846,137 B1, 5,324,623, 5,853, 960 and 5,871,888. It is common to all the aforementioned methods that a certain thickness is necessary in principle and the light which passes through the microlens must pass through not only the lens, but also the carrier substrate.

As a result of the simultaneously required high quality and the demands for higher resolution with simultaneously high brilliance, which depends among others on the thickness and the number of optics along the optical axis, therefore the beam path, further optimization of the microlenses according to the prior art is desirable.

Moreover there is a requirement for radiant efficiency which is as high as possible and which is decisive especially for micro optics systems, since the image sensor occupies a generally very small area on which light is incident.

U.S. Pat. No. 6,049,430 shows a lens which has been inserted in an opening of a carrier substrate, and the production process shown in FIG. 2 requires a plurality of steps and is therefore complex and due to the production accuracies which can be attained here would be too inaccurate for the aforementioned requirements. The plurality of materials to be used is also a disadvantage.

SUMMARY OF THE INVENTION

Therefore the object of this invention is to devise a microlens which can be produced especially in large-scale production with a radiant efficiency and brilliance as high as possible, which can be produced by a method as claimed in the invention and a device as claimed in the invention in a simple manner which is suitable for large-scale production with a flexible mold.

This object is achieved with the features of the claims. Advantageous developments of the invention are given in the dependent claims. All combinations of at least two of the features given in the specification, the claims and/or the figures also fall within the framework of the invention. At the given value ranges, values within the indicated limits will also be disclosed as boundary values and will be claimed in any combination.

The invention is based on the idea of producing a microlens by molding a lens directly into the carrier wafer so that the carrier wafer does not obstruct the light beam passing through the lens or is located outside the beam path. Thus the lens is molded from two sides of the carrier wafer by an upper and a lower lens die so that a high precision microlens can be produced by especially collinear alignment of the upper lens die to the lower lens die and/or to the carrier wafer. Deviating from the existing procedure in the prior art makes it possible as claimed in the invention to make the lens mold more flexible, especially in the region of the lower lens side which had been previously covered by the carrier wafer.

The rigid carrier wafer provides for stability of shape in the production of the lens since it generally entails expansion/shrinkage of the lens.

In particular, in the simultaneous production of a plurality of lenses with one carrier wafer matrix and two lens die matrices which is enabled by this method and the device as claimed in the invention, the carrier wafer ensures moreover the integrity of the optical axes of the lenses to one another. The respective grid positions of each corresponding upper and lower die and the corresponding opening of the carrier wafer can thus be exactly aligned since the carrier wafer is not subjected to changes in size in production. With one carrier wafer matrix and the two corresponding lens die matrices, at a carrier wafer diameter of 200 mm roughly 2000 lenses can be produced with one process run as claimed in the invention.

As claimed in the invention, there is a microlens negative on each lens die whose shape determines the curvature of the respective side of the microlens produced with the method as claimed in the invention. The shape of the lenses can be made convex, planar or concave. The lens profile can be spherical or aspherical as claimed in the invention.

The lens is formed from UV-curable or thermally curable lens material, one of the two lens dies being made UV-transparent in the case of the UV-curable lens material. The lens material as claimed in the invention is at least largely, preferably completely free of solvent and is suitable for complete crosslinking.

The carrier wafer which is provided as claimed in the invention and into which the lens can be molded or is molded, is used for holding and fixing of the lens in the microlens which has been produced as claimed in the invention and especially as spacer between the upper and the lower lens die so that among others the thickness of the microlens is influenced by the thickness of the carrier wafer. The carrier wafer can also be advantageously used for producing a plurality of microlenses by many lenses being molded into the carrier wafer and being divided later into individual microlenses. To the extent the carrier wafer is made as a ring with an opening for holding the lens, the lens is held and stabilized on its entire circumference by the carrier wafer. The lens ring can be made square, semicircular, triangular, elliptical on its inside and/or its outside, on the inner ring be advantageously a holding structure, especially projections, being designed for more effective fixing of the lens in the carrier wafer, preferably as openings of the carrier wafer, therefore in one piece with the carrier wafer. Preferably the holding structures project over the inside of the ring by at least one fifth of the thickness of the carrier wafer.

Alternatively the holding structure is made as surface roughness of the inner ring of the carrier wafer on which the lens material and the cured lenses are held in the direction of the optical axis.

To avoid thermal expansion or thermal stresses it is advantageously provided that the lens material and the carrier wafer have a coefficient of thermal expansion of roughly the same magnitude. To the extent the lens and the carrier wafer have a different coefficient of thermal expansion the lens as claimed in the invention is made such that the shape of the lens at different temperatures essentially scales so that the lens in different temperature states is self-similar and hardly changes its optical properties. In this case it is advantageous if the lens as claimed in the invention has a greater coefficient of thermal expansion in the cured state than the carrier wafer. In this way, in the production of the microlens a minimum empty space is formed between the carrier wafer and the lens which is used as a buffer for the expansion of the lens at different temperatures in the production of the microlens due to the larger coefficient of thermal expansion of the lens when the lens is cooled during production. As claimed in the invention in the production of the microlens, especially in a UV-curing lens material there can be heating during curing of the lens material in order to achieve the aforementioned effect.

Accordingly the lens as claimed in the invention is connected positively to the carrier wafer, especially to the inner ring of the carrier wafer.

The lens dies in one advantageous embodiment consist of a carrier substrate and a microlens negative which is fixed on the carrier substrate. According to one embodiment of the lens die at least one lens die is provided with a drain for excess lens material.

The process for producing the microlens preferably proceeds as follows:

The microlens negative of the lower lens die is fixed, especially by fixing of the lens die by a receiving means for accommodating the lower lens die. Then the carrier wafer is aligned/adjusted to the microlens negative of the lower lens die such that the optical axis of the microlens negative and the longitudinal center axis of the carrier wafer are collinear. Alternatively and especially for production of several lenses simultaneously with a carrier wafer the carrier wafer is adjusted coplanarly with the carrier substrate of the lower lens die. Then the carrier wafer is placed and fixed on the carrier substrate of the microlens negative, therefore on the lens die. Fixing is conceivable by vacuum structures in the lens die or electrostatically by electrostatic means machined into the lens die, but also mechanically by clamping and/or adhesion.

Then lens material, especially a UV-curable or thermoplastically curable polymer, is introduced into the opening of the carrier wafer by way of the microlens negative of the lower lens die, the viscosity of the lens material during introduction being chosen such that the lens space formed by the inner ring of the carrier wafer and the lens die can be filled free of bubbles. The amount of lens material added is such that in subsequent embossing of the lens there is enough lens material to fill the microlens negative of the upper lens die.

In one alterative embodiment introduction takes place over the entire surface on the carrier wafer/carrier wafer matrix, as a result of which the opening/openings is/are filled and excess lens material or lens material which is needed for the lens structures which project over the carrier wafer covers the carrier wafer/carrier wafer matrix.

According to another alternative embodiment of the invention, the lens material is delivered individually into the opening(s) of the carrier wafer/carrier wafer matrix, especially by metering with a droplet dispenser or with a pipette.

Then the optical axis of the upper lens die is calibrated collinearly with the optical axis of the lower lens die or the lens negative of the lower lens die and/or with the longitudinal center axis of the carrier wafer. Then the upper lens die is pressed with pressure onto the lower lens die and the carrier wafer which is located in between. In the case of UV curing the lens material is irradiated by means of UV light with relatively high intensity through the upper lens die which in this case is transparent or UV-permeable, and/or through the lower lens die, and the polymer is crosslinked. In thermoplastic curing the material of the lens die is provided with relatively high thermal conductivity in order to promote heat transport.

The alignment of the lens dies with the carrier wafer takes place by an alignment mechanism, especially with an alignment precision of less than 500 µm, especially less than 200 µm, preferably less than 100 µm, ideally less than 70 µm deviation and/or with optical alignment means with an alignment precision of less than 10 µm, especially less than 5 µm, preferably less than 3 µm deviation. Optical alignment is especially advantageous for the alignment of the upper and lower lens die or the upper and lower lens die matrix. Optical means are especially lasers or microscopes which enable exact alignment by markings on the lens dies or on the lens die matrices.

According to one especially preferred embodiment of the invention the lens die is aligned, especially in addition to the alignment on the carrier wafer, by parallel alignment of the lens dies to one another, the position of the optical axis/axes of the lens negatives being taken into account.

By the contact surfaces of the lens dies adjoining the corresponding mating surfaces of the carrier wafer for coplanar alignment of the lens dies during stamping, the lens dies are aligned using the especially parallel opposite mating surfaces of the carrier wafer, as a result of which the optical axes of the lens negatives are exactly aligned.

As claimed in the invention a deviation of less than 10 µm over the width of each lens which is between 100 µm and 6 mm means parallel. At most the deviation of the parallelism is therefore 10%, especially less than 7%, preferably less than 5%, even more preferably less than 3%, ideally less than 1.5%. Thus essentially ideal agreement of the optical axes is enabled. The height of the lenses is conventionally between 50 and 500 µm, and the height for the microlens as claimed in the invention compared to the prior art can be reduced essentially by the width of the carrier wafer.

According to one embodiment of the invention, on the microlens, especially parallel to the optical axis of the lens, there is a self-centering structure, especially as an opening of the carrier wafer, which is used for example for automatic alignment of the microlens with another microlens which has a corresponding, inverted structure, especially in the form of orientation ribs. The self-alignment works according to the key-lock principle or in the manner of a tongue-in groove joint. A cone-like configuration of the tongue-in-groove joint is especially preferred.

The description of the method and of the device for producing an individual microlens relates analogously to the production of a plurality of microlenses with the feature that it is enabled only by the configuration as claimed in the invention. Instead of an upper lens die an upper lens die matrix is used which comprises several lens dies, especially as a one-piece lens die structure. The lower lens die matrix is formed analogously. The carrier wafer as a carrier wafer matrix, especially in the form of a one-piece carrier wafer structure, is provided with a plurality of openings.

For action in the preferred alternative in which the lens die matrices are aligned on the contact surfaces of the lens die matrices, the carrier wafer matrix can be penetrated by a spacer of the upper and/or lower lens die matrix which forms the contact surface at the time and dictates the thickness of the lens.

According to one independent version of the invention, the carrier wafer after producing the microlens is at least partially, preferably completely removed. In this way the dimensions and the weight of the lens are further reduced. Removal takes place preferably by ejecting the lens from the carrier wafer which is provided especially with a holding structure with minor projections. Minor projections are made especially as surface roughness of the inner ring.

Other advantages, features and details of the invention will become apparent from the following description of preferred exemplary embodiments and using the drawings.

BRIEF DESCRIPTION OF THE DRAWINGS

FIG. 6 shows a schematic of a device as claimed in the invention for producing a plurality of microlenses.

DETAILED DESCRIPTION OF PREFERRED EMBODIMENTS

In the figures the same parts and parts with the same function are labeled with the same reference numbers.

Figure 1:
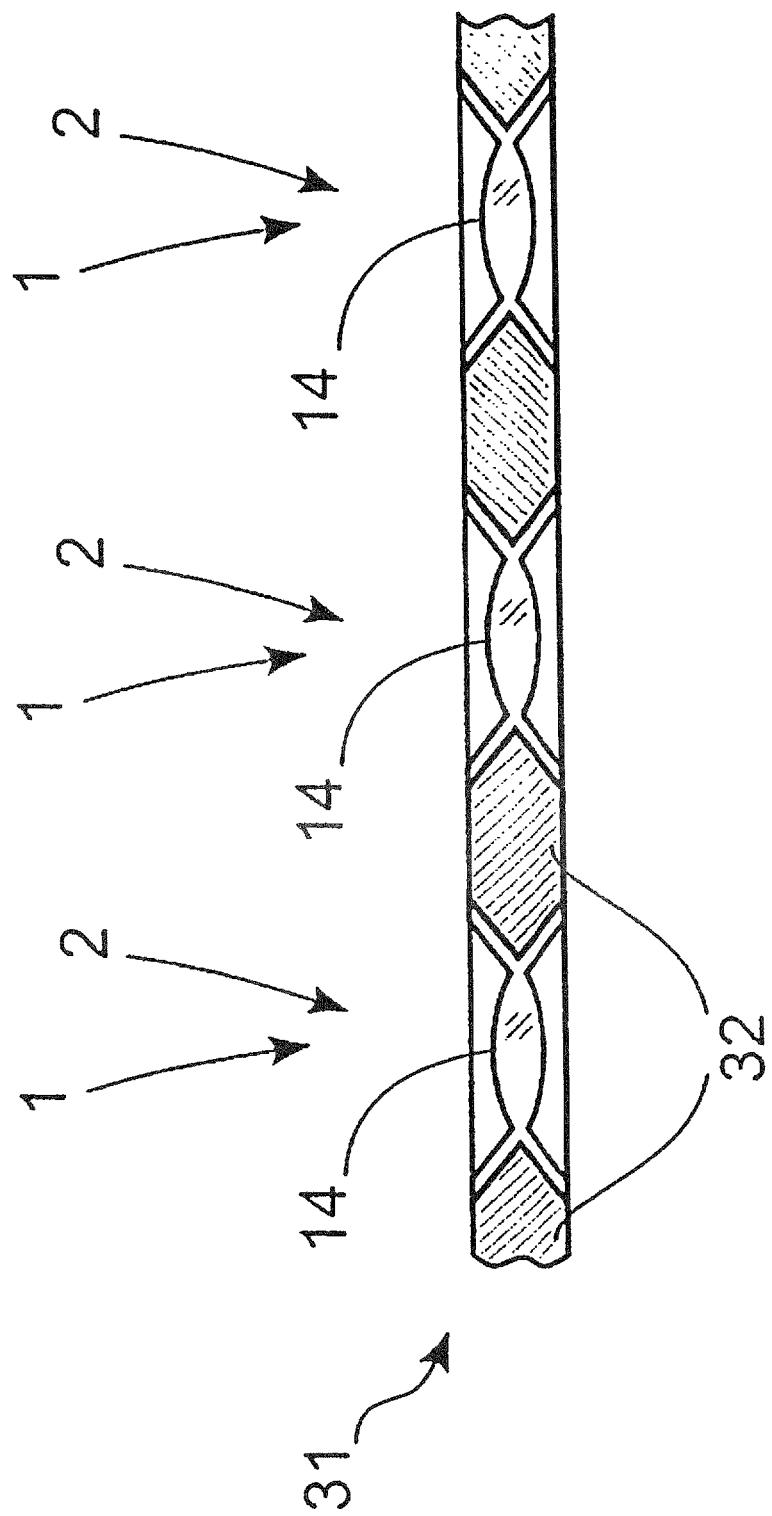
FIG. 1 shows a schematic cross sectional view of a microlens matrix as claimed in the invention consisting of a plurality of lenses molded into a carrier wafer structure.

FIG. 1 shows a microlens matrix 31 in cross section which consists of a carrier wafer structure 32 and a plurality of lenses 14 molded into openings 2 of the carrier wafer structure 32 or the later carrier wafer 17. The microlens matrix 31 can be separated by known cutting methods into individual microlenses 1, as is shown isolated in the exploded representation in FIG. 2.

Figure 2:
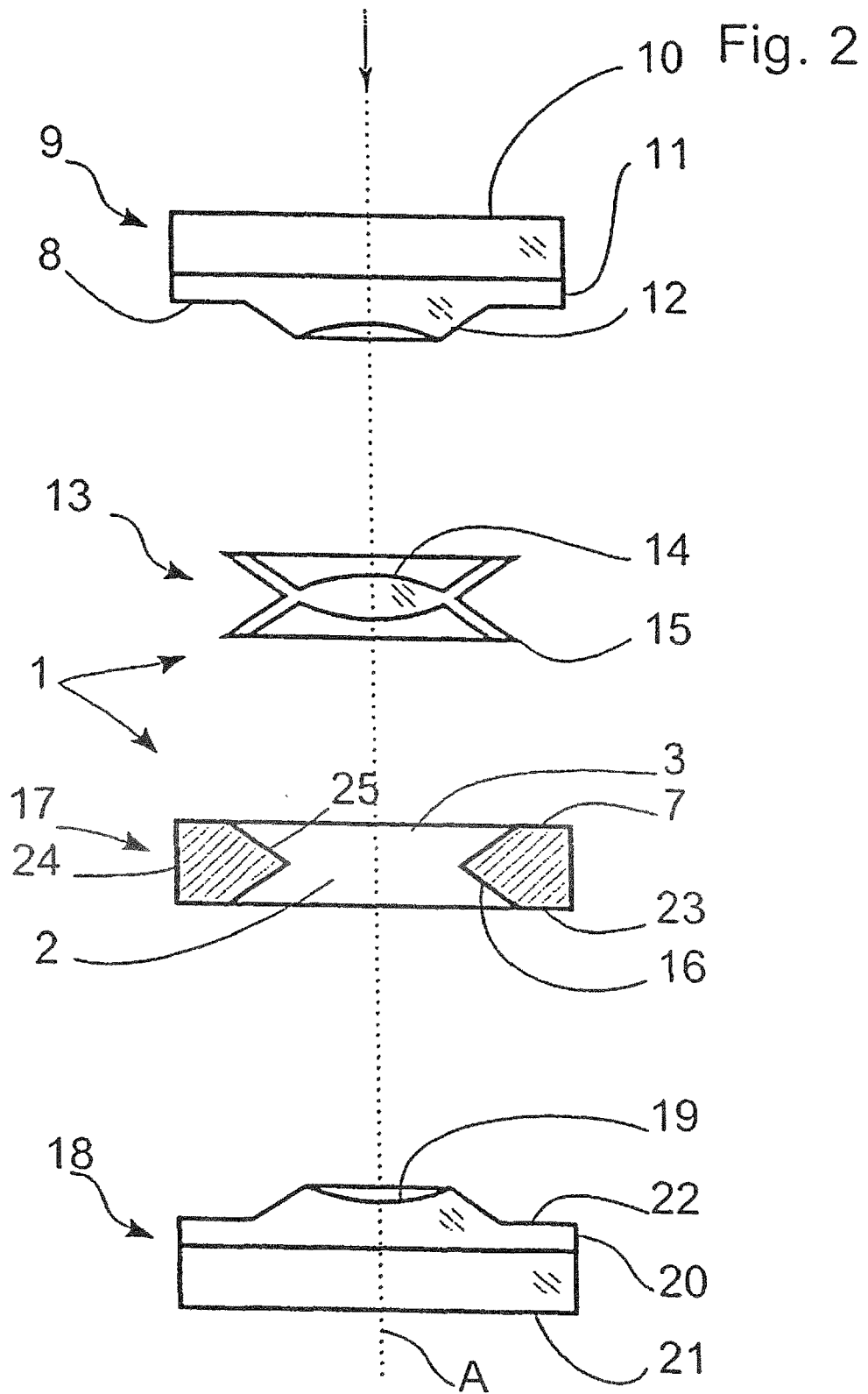
FIG. 2 shows a schematic of a device as claimed in the invention for producing a microlens as claimed in the invention.

The microlenses 1 can be produced as microlens matrix 31 in large-scale production, but can also be produced individually. FIG. 2 schematically shows production using an individual microlens 1.

As shown in FIG. 2, a lower lens die 18 consisting of a carrier substrate 21 and a lens mold 20 which has been fixed, especially cemented, on the carrier substrate 21 can be accommodated on receiving means of the device as claimed in the invention which are not shown. In large-scale production on the carrier substrate 21 there can be a plurality of lens molds 20 or one lens mold 20 with a plurality of lens negatives 19, the lens negatives 19 or the lens molds 20 being applied to the carrier substrate 21 such that they can be aligned flush with the openings 2 which are shown in FIG. 1.

The lens negative 19 is surrounded by a contact surface 22 which is located orthogonally to the optical axis of the lens negative 19 and on which the carrier wafer 17 comes into contact with a corresponding mating surface 23 which is annular in this exemplary embodiment, forming a seal.

As soon as the carrier wafer 17, as shown in FIG. 2, is aligned with its longitudinal center axis to the optical axis A, the carrier wafer 17 with its mating surface 23 is fixed on the contact surface 22 so that an inner ring 16 of the carrier wafer 17 and the lens mold 20 form a lens space 3 into which the lens material which forms the lens 14 can be introduced via delivery means. After delivering the lens material into the lens space 3 the lens 14 is stamped as described below.

For this purpose an upper lens die 9 which is provided by receiving means for accommodating an upper lens die 9 can be aligned by alignment means for alignment of the upper lens die 9 with the opening 14 and/or the lower lens die 18, especially to the optical axis A of a lens negative 12 of a lens mold 11 applied on a carrier substrate 10. The upper lens die 9 is formed analogously to the lower lens die 18 and has a contact surface 8 for especially sealing contact of the upper lens die 9 with one mating surface 7 of the carrier wafer 17. The mating surface 7 is located opposite the mating surface 23 and parallel to it.

After alignment of the upper lens die 9, the upper lens die 9 is lowered along the optical axis A onto the carrier wafer 17 and subjected to pressure, the corresponding counter pressure being applied via the lower lens die 18. The lens material fills the lens space 3 without bubbles and possible excess lens material can drain or be sucked out of the lens space 3 via a drain system which is not shown in the figures.

According to one preferred embodiment of the invention the lens material can be optimally subjected to pressure when a vacuum, especially with a pressure <500 mbar, preferably <300 mbar, even more preferably <than 200 mbar, ideally <100 mbar, is applied by vacuum means at the same time in the opening, especially between the upper lens die and the carrier wafer.

According to one still more preferred embodiment the vacuum during pressurization is <70 mbar, especially <40 mbar, preferably <15 mbar, even more preferably <5 mbar.

The lens material is cured via curing means of the device so that a hard lens 14 is formed which corresponds to the shape according to the lens space 3. The curing means can be a light source for UV light for UV-curable lens material or heating means for thermoplastically curable polymer as lens material.

By the carrier wafer 17 which has the inner ring 16 and an outer ring 24 having a holding structure 25 in the form of a projection which projects sharply in the direction of the optical axis A of the inner ring 16 in the illustrated exemplary embodiment as shown in FIG. 2, the lens 14 and the carrier wafer 17 form a positive connection which cannot be nondestructively broken. As shown in FIG. 2, holding structure 25 extends from inner ring 16 at a location spaced from mating surfaces 7, 23 of carrier wafer 17. As such, holding structure 25 projects into an outer peripheral portion of lens 14.

Figure 3:
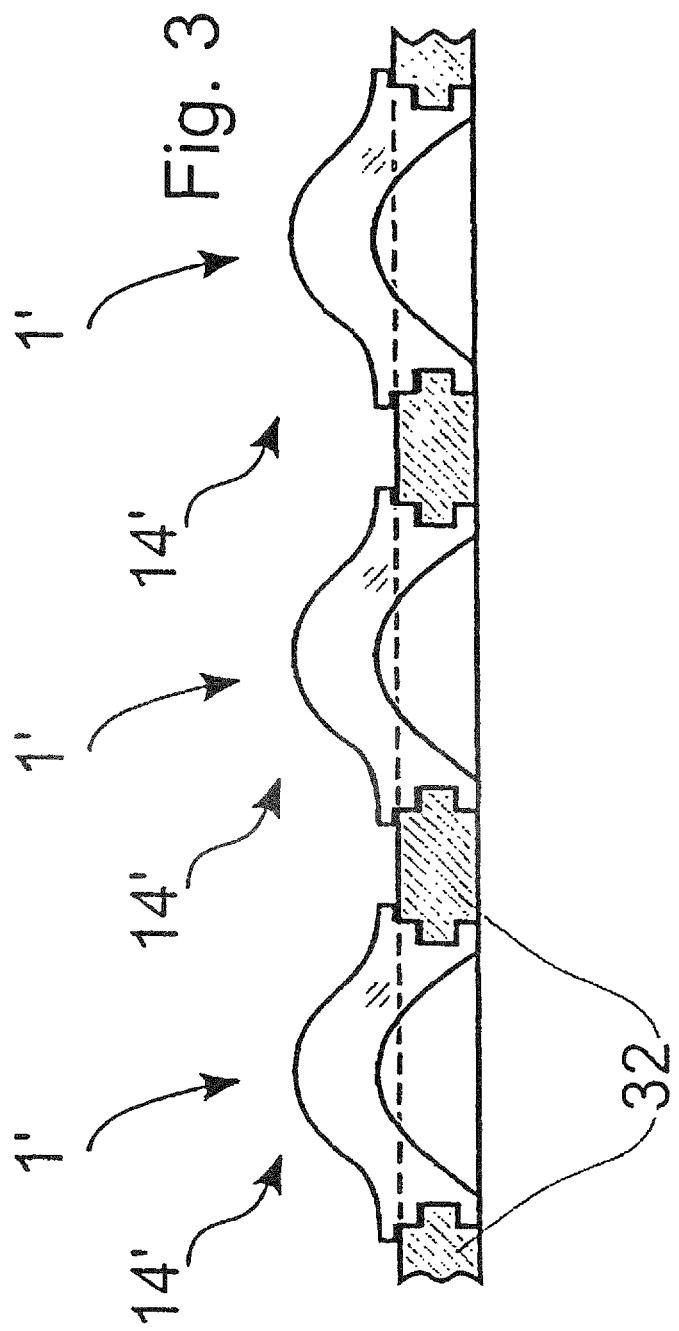
FIG. 3 shows a schematic of a microlens matrix as claimed in the invention consisting of a plurality of lenses molded in a carrier wafer structure according to one alternative embodiment.
Figure 4:
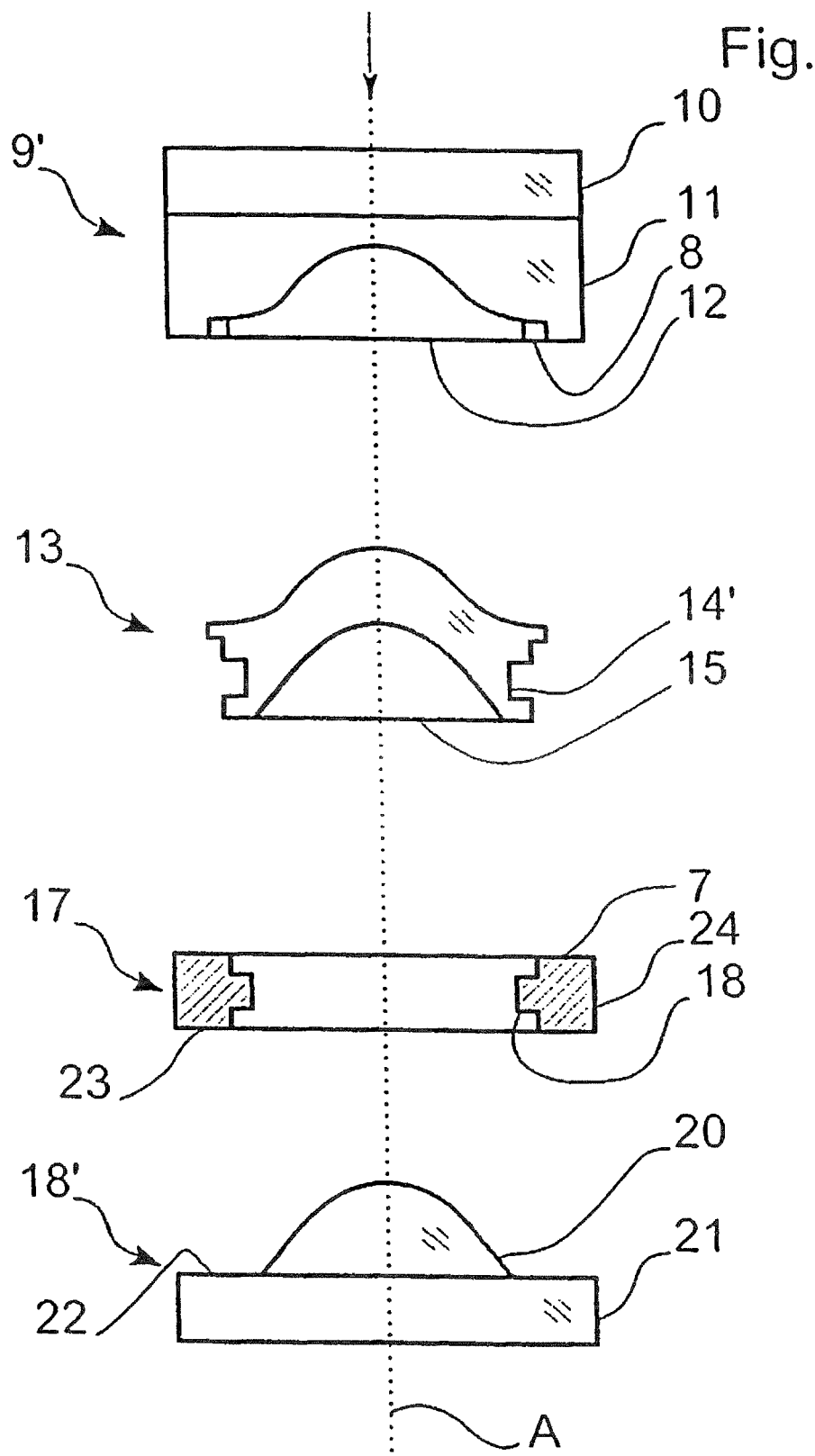
FIG. 4 shows a schematic of a device as claimed in the invention for producing a microlens as claimed in the invention according to one alternative embodiment.
Figure 5:
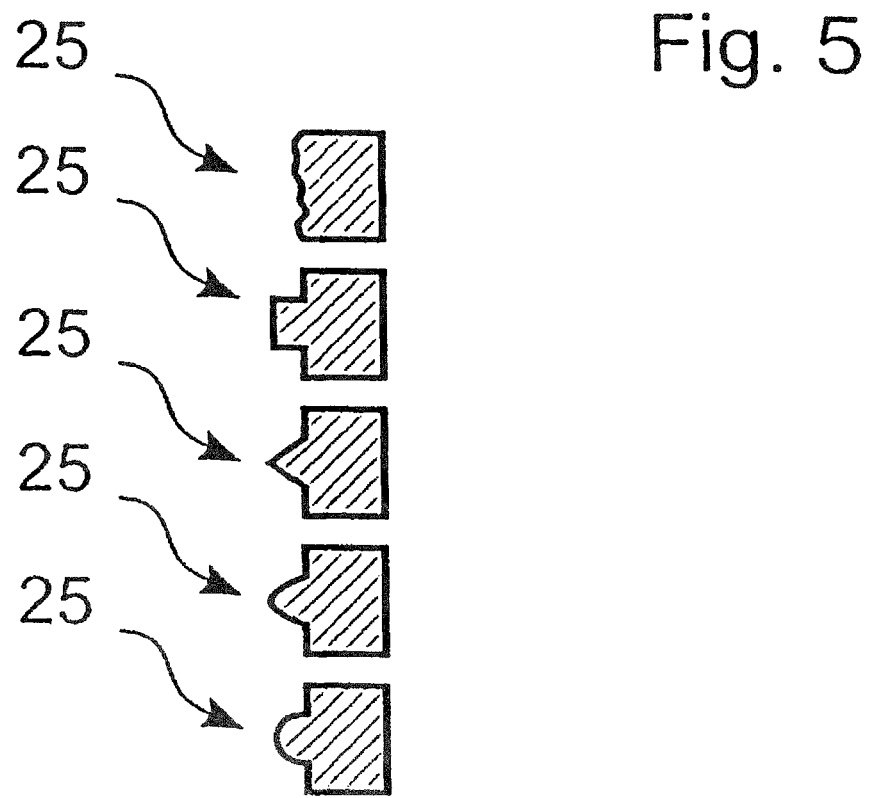
FIG. 5 shows a schematic of shapes of a holding structure as claimed in the invention.

Alternative shapes of the holding structure 25 are shown in FIG. 5. The alternative embodiment shown in FIGS. 3 and 4 corresponds, with the difference that the lens 14' in the exemplary embodiment shown here acquires a different shape, to the exemplary embodiment of the invention shown in FIGS. 1 and 2. Other changes of shape without functional changes relate to the lens 1', the upper carrier wafer 9' and the lower carrier wafer 18'. Reference is made to the explanation for FIGS. 1 and 2 as well as 5.

FIG. 6 shows a device for executing the method as claimed in the invention with receiving means 50 for accommodating the upper lens die matrix 4 which has a plurality of upper lens dies 9, 9' and receiving means 51 for accommodating the lower lens die matrix 5 which has a plurality of lower lens dies 18, 18'. The receiving means 50, 51 each consist of a chuck 52, 53 and one die holder 54, 55 which is U-shaped in cross section and which is attached to the respective chuck 52, 53 for example via vacuum paths (not shown).

The upper and/or the lower receiving means 50, 51 can be moved up and down by a control which is not shown.

On the lower lens die matrix 5 there are alignment means 56 for alignment of the lower lens die matrix 5. On the upper lens die matrix 4 there are alignment means 57 for alignment of the upper lens die matrix 4. On the carrier wafer matrix 32 there are alignment means 58 for alignment of the carrier wafer matrix 32.

The alignment means 56, 57 and/or 58 comprise at least one optical system (not shown) and are controlled by a control unit which is not shown. Furthermore the alignment means 56, 57 and/or 58 comprise movement means for moving the receiving means 50 and/or 51 parallel to the carrier wafer matrix 32.

On the lower receiving means 51 there are fixing means 59 for fixing the carrier wafer matrix 32 with the lower lens die matrix 5 after alignment by the alignment means 56.

Furthermore, there is delivery means 60 in the form of an injection means 61 with an especially interchangeable injector 62 which is connected to a storage tank for the lens material via a flexible fluid line 62. The injection means 61 is made as a drop dispenser and can approach each opening 2 of the carrier wafer structure and add a given amount of lens material to it.

Stamping means for applying pressure apply an adjustable superficial force along the carrier wafer matrix, especially by forces Fo and Fu which are applied to the alignment means 50, 51 and which act oppositely in the direction of the carrier wafer matrix, for example transferring the force by one hydraulic cylinder at a time.

Furthermore the device comprises means for curing of the lens material during stamping, especially a UV light source and/or heating means which acts on the lens material.

Having described the invention, the following is claimed:

1. A method for producing a microlens comprising:
   providing a carrier wafer having an opening for accommodating the microlens, said opening defined by an inner ring surface that extends between a pair of opposite facing lower and upper carrier surfaces of the carrier wafer, wherein the lower and upper carrier surfaces provide respective lower and upper mating surfaces, and a thickness of the carrier wafer is defined by a distance between the opposite facing lower and upper carrier surfaces;
   providing a lens material in the opening of the carrier wafer, said lens material forming the microlens;
   providing lower and upper lens dies, each lens die having a respective contact surface; and
   molding the microlens into the carrier wafer by a stamping process that includes acting on the lens material in the opening of the carrier wafer with the lower and upper lens dies such that the carrier wafer acts as a spacer between the lower and upper lens dies, wherein the contact surfaces of the lower and upper lens dies respectively contact the lower and upper mating surfaces of the carrier wafer for coplanar alignment of the lower and upper lens dies during the stamping process,
   wherein the microlens molded by the stamping process has a thickness that is defined by the thickness of the carrier wafer such that the thickness of the molded microlens is not greater than the thickness of the carrier wafer.

2. A method as claimed in claim 1, wherein the carrier wafer is located outside a light beam path of the microlens, whereby the carrier wafer does not obstruct a light beam passing through the microlens.

3. A method as claimed in claim 1, wherein the step of molding the microlens includes:
   aligning and fixing of the lower lens die with the opening of the carrier wafer;
   delivering the lens material into the opening of the carrier wafer;
   acting on the lens material in the opening with the upper lens die; and
   curing the microlens.

4. A method as claimed in claim 1, wherein a holding structure extends inward from the inner ring surface at a location spaced from both of the opposite facing lower and upper carrier surfaces, said holding structure comprised of an annular projection.

5. A method as claimed in claim 1, wherein a holding structure extends inward from the inner ring surface at a location spaced from both of the opposite facing lower and upper carrier surfaces, said holding structure comprised of a plurality of projections.

6. A method for producing a plurality of microlenses, comprising:
   providing a carrier wafer matrix having a plurality of openings for respectively accommodating the plurality of microlenses, each opening defined by an inner ring surface that extends between a pair of opposite facing lower and upper carrier surfaces of the carrier wafer matrix, wherein the lower and upper carrier surfaces respectively provide a plurality of lower and upper mating surfaces, and a thickness of the carrier wafer matrix is defined by a distance between the opposite facing lower and upper carrier surfaces;
   providing a lens material in each of the openings of the carrier wafer matrix, said lens material forming the plurality of microlenses;
   providing lower and upper lens die matrices, each lens die matrix having a plurality of contact surfaces; and
   molding the plurality of microlenses into the carrier wafer matrix by a stamping process that includes acting on the lens material in the plurality of openings of the carrier wafer matrix with the lower and upper lens die matrices such that the carrier wafer matrix acts as a spacer between the lower and upper lens dies, wherein the contact surfaces of the lower and upper lens die matrices respectively contact the lower and upper mating surfaces of the carrier wafer matrix for coplanar alignment of the lower and upper lens die matrices during the stamping process,
   wherein each of the microlenses molded by the stamping process has a thickness that is defined by the thickness of the carrier wafer such that the thickness of each microlens is not greater than the thickness of the carrier wafer.

7. A method as claimed in claim 6, wherein the carrier wafer matrix is located outside a light beam path of the microlenses, whereby the carrier wafer matrix does not obstruct a light beam passing through the microlenses.

8. A method as claimed in claim 6, wherein the step of molding the plurality of microlenses includes:
- aligning and fixing of the lower lens die matrix with the plurality of openings of the carrier wafer matrix;
- delivering the lens material into the plurality of openings of the carrier wafer matrix;
- acting on the lens material in the plurality of openings with the upper lens die matrix; and
- curing the plurality of microlenses.

9. A method as claimed in claim 6, wherein a holding structure extends inward from each of the inner ring surfaces at a location spaced from both of the opposite facing lower and upper carrier surfaces, said holding structure comprised of an annular projection.

10. A method as claimed in claim 6, wherein a holding structure extends inward from each of the inner ring surfaces at a location spaced from both of the opposite facing lower and upper carrier surfaces, said holding structure comprised of a plurality of projections.

11. A method as claimed in claim 6, wherein a coefficient of thermal expansion of each microlens is greater than a coefficient of thermal expansion of the carrier wafer matrix such that a gap is formed between each microlens and the carrier wafer matrix during said molding of the plurality of microlenses.

12. A method as claimed in claim 1, wherein a coefficient of thermal expansion of the microlens is greater than a coefficient of thermal expansion of the carrier wafer such that a gap is formed between the microlens and the carrier wafer during said molding of the microlens.

13. A method as claimed in claim 6, wherein said stamping process includes application of respective forces by the lower and upper lens die matrices to the opposite-facing lower and upper mating surfaces of the carrier wafer such that all of said lens material is located within the plurality of openings between the lower and upper mating surfaces of the carrier wafer after the stamping process.

14. A method as claimed in claim 1, wherein said stamping process includes application of respective forces by the lower and upper lens dies to the opposite-facing lower and upper mating surfaces of the carrier wafer such that all of the lens material is located within the opening between the lower and upper mating surfaces of the carrier wafer after the stamping process.

* * * * *